US011156128B2

(12) United States Patent
Miller et al.

(10) Patent No.: US 11,156,128 B2
(45) Date of Patent: Oct. 26, 2021

(54) EMBEDDED ELECTRIC MACHINE

(71) Applicant: General Electric Company, Schenectady, NY (US)

(72) Inventors: Brandon Wayne Miller, Liberty Township, OH (US); Randy M. Vondrell, Cincinnati, OH (US); Darek Tomasz Zatorski, Fort Wright, KY (US); Christopher Charles Glynn, Clearwater Beach, FL (US)

(73) Assignee: General Electric Company, Schenectady, NY (US)

( * ) Notice: Subject to any disclaimer, the term of this patent is extended or adjusted under 35 U.S.C. 154(b) by 162 days.

(21) Appl. No.: 16/108,732

(22) Filed: Aug. 22, 2018

(65) Prior Publication Data

US 2020/0063606 A1 Feb. 27, 2020

(51) Int. Cl.
| | |
|---|---|
| *F01D 25/28* | (2006.01) |
| *B64D 27/10* | (2006.01) |
| *F01D 15/10* | (2006.01) |
| *B64D 27/02* | (2006.01) |

(52) U.S. Cl.
CPC ............. *F01D 25/28* (2013.01); *B64D 27/10* (2013.01); *F01D 15/10* (2013.01); *B64D 2027/026* (2013.01); *F05D 2220/323* (2013.01)

(58) Field of Classification Search
CPC ......... F01D 25/28; F01D 15/10; B64D 27/10; B64D 2027/026; B64F 5/40; F02K 5/00; F02K 1/04
See application file for complete search history.

(56) References Cited

U.S. PATENT DOCUMENTS

| | | | |
|---|---|---|---|
| 1,362,380 | A | 12/1920 | Woolson |
| 1,936,737 | A | 11/1933 | Tingley |
| 2,039,199 | A | 4/1936 | Swendsen |
| 2,429,061 | A | 10/1947 | Hunter |
| 2,446,999 | A | 8/1948 | Camilli |
| 2,812,912 | A | 11/1957 | Stevens et al. |
| 2,837,671 | A | 6/1958 | Reardon et al. |
| 3,208,217 | A | 9/1965 | Sonder |

(Continued)

FOREIGN PATENT DOCUMENTS

| | | |
|---|---|---|
| EP | 2128419 A1 | 12/2009 |
| EP | 2597269 A2 | 5/2013 |

(Continued)

OTHER PUBLICATIONS

European Search Report Corresponding to Application No. 19192489 dated Jan. 9, 2020.

(Continued)

*Primary Examiner* — Eldon T Brockman
(74) *Attorney, Agent, or Firm* — Dority & Manning, P.A.

(57) ABSTRACT

A method is provided for maintaining a gas turbine engine installed on an aircraft, the gas turbine engine including an electric machine mounted at least partially inward of a core air flowpath of the gas turbine engine. The method includes removing a rotor mount connecting a rotor of the electric machine to a rotary component of the gas turbine engine; removing a stator mount connecting a stator of the electric machine to a stationary component of the gas turbine engine; and removing in situ the electric machine.

18 Claims, 7 Drawing Sheets

(56) References Cited

U.S. PATENT DOCUMENTS

| | | |
|---|---|---|
| 3,286,470 A | 11/1966 | Gerlaugh |
| 3,312,448 A | 4/1967 | Hull, Jr. et al. |
| 3,332,242 A | 7/1967 | Douglas |
| 3,478,421 A | 11/1969 | Preece |
| 3,485,442 A | 12/1969 | Anderson et al. |
| 3,688,505 A | 9/1972 | Dison |
| 3,844,110 A | 10/1974 | Widlansky et al. |
| 4,089,493 A | 5/1978 | Paulson |
| 4,187,441 A | 2/1980 | Oney |
| 4,324,996 A | 4/1982 | Adelski et al. |
| 4,370,560 A | 1/1983 | Faulkner et al. |
| 4,433,261 A | 2/1984 | Nashiki et al. |
| 4,433,473 A | 2/1984 | Benedetti |
| 4,605,185 A | 8/1986 | Reyes |
| 4,634,191 A | 1/1987 | Studer |
| 4,674,716 A | 6/1987 | Moore |
| 4,860,537 A | 8/1989 | Taylor |
| 4,909,031 A | 3/1990 | Grieb |
| 4,913,380 A | 4/1990 | Verdaman et al. |
| 5,115,173 A | 5/1992 | Kobayashi et al. |
| 5,125,597 A | 6/1992 | Coffinbeny |
| 5,174,109 A | 12/1992 | Lampe |
| 5,183,222 A | 2/1993 | Ramsey, Jr. |
| 5,188,002 A | 2/1993 | Wolf et al. |
| 5,269,135 A | 12/1993 | Vermejan et al. |
| 5,285,123 A | 2/1994 | Kataoka et al. |
| 5,300,845 A | 4/1994 | Fanning et al. |
| 5,793,137 A | 8/1998 | Smith |
| 5,799,484 A | 9/1998 | Nims |
| 5,925,961 A | 7/1999 | Sugiyanma |
| 5,927,644 A | 7/1999 | Ellis et al. |
| 5,931,052 A | 8/1999 | Zhao et al. |
| 6,062,104 A | 5/2000 | Allport |
| 6,092,360 A | 7/2000 | Hoag et al. |
| 6,105,697 A | 8/2000 | Weaver |
| 6,128,896 A | 10/2000 | Saiz |
| 6,169,332 B1 | 1/2001 | Taylor et al. |
| 6,225,724 B1 | 5/2001 | Toide et al. |
| 6,545,373 B1 | 4/2003 | Andres et al. |
| 6,583,528 B2 | 6/2003 | Gabrys |
| 6,651,929 B2 | 11/2003 | Dionne |
| 6,675,759 B2 | 1/2004 | Johnson et al. |
| 6,732,502 B2 | 5/2004 | Seda et al. |
| 6,769,874 B2 | 8/2004 | Arel |
| 6,834,831 B2 | 12/2004 | Daggett |
| 6,856,051 B2 | 2/2005 | Reiter, Jr. et al. |
| 6,888,270 B2 | 5/2005 | Reiter, Jr. et al. |
| 6,940,200 B2 | 9/2005 | Lopatinsky et al. |
| 6,966,174 B2 | 11/2005 | Paul |
| 6,976,655 B2 | 12/2005 | Thompson |
| 6,992,403 B1 | 1/2006 | Raad |
| 7,000,404 B2 | 2/2006 | Palmisano et al. |
| 7,251,942 B2 * | 8/2007 | Dittmar .................. B64D 41/00 60/39.83 |
| 7,267,300 B2 | 9/2007 | Heath et al. |
| 7,285,871 B2 | 10/2007 | Derouineau |
| 7,291,936 B1 | 11/2007 | Robson |
| 7,380,749 B2 | 6/2008 | Fucke et al. |
| 7,387,189 B2 | 6/2008 | James et al. |
| 7,398,641 B2 | 7/2008 | Stretton et al. |
| 7,417,337 B1 | 8/2008 | Suttie |
| 7,493,754 B2 | 2/2009 | Moniz et al. |
| 7,495,354 B2 | 2/2009 | Herrmann |
| 7,514,810 B2 | 4/2009 | Kern et al. |
| 7,521,832 B2 | 4/2009 | Tajima et al. |
| 7,528,499 B2 | 5/2009 | Suttie |
| 7,619,331 B2 | 11/2009 | Bouiller et al. |
| 7,665,689 B2 | 2/2010 | McComb |
| 7,677,502 B2 | 3/2010 | Lawson et al. |
| 7,685,828 B2 | 3/2010 | Foucault et al. |
| 7,752,834 B2 | 7/2010 | Addis |
| 7,806,363 B2 | 10/2010 | Udall et al. |
| 7,818,969 B1 | 10/2010 | Hotto |
| 7,819,358 B2 | 10/2010 | Belleville |
| 7,832,193 B2 | 11/2010 | Orlando et al. |
| 7,841,163 B2 * | 11/2010 | Welch .................. F02C 7/32 60/39.091 |
| 7,855,483 B2 | 12/2010 | Bouiller et al. |
| 7,905,449 B2 | 3/2011 | Cazals et al. |
| 7,937,927 B2 | 5/2011 | Suciu et al. |
| 7,942,646 B2 | 5/2011 | Zhou et al. |
| 7,946,403 B2 | 5/2011 | Burke et al. |
| 7,952,244 B2 | 5/2011 | Colin |
| 7,958,727 B2 | 6/2011 | Arnold |
| 7,966,833 B2 | 6/2011 | Beutin et al. |
| 7,970,497 B2 | 6/2011 | Derouineau et al. |
| 7,971,499 B2 | 7/2011 | Herlihy et al. |
| 7,976,273 B2 | 7/2011 | Suciu et al. |
| 8,016,228 B2 | 9/2011 | Fucke et al. |
| 8,026,624 B2 | 9/2011 | Beutin et al. |
| 8,033,094 B2 | 10/2011 | Suciu et al. |
| 8,039,983 B2 | 10/2011 | Cote et al. |
| 8,074,777 B2 | 12/2011 | Birdi et al. |
| 8,093,747 B2 | 1/2012 | Pearson et al. |
| 8,099,944 B2 | 1/2012 | Foster et al. |
| 8,109,073 B2 | 2/2012 | Foster et al. |
| 8,113,005 B2 | 2/2012 | Gotz et al. |
| 8,128,019 B2 | 3/2012 | Annati et al. |
| 8,141,360 B1 | 3/2012 | Huber |
| 8,162,254 B2 | 4/2012 | Roche |
| 8,193,761 B1 | 6/2012 | Singh |
| 8,220,739 B2 | 7/2012 | Cazals |
| 8,226,040 B2 | 7/2012 | Neto |
| 8,291,716 B2 | 10/2012 | Foster et al. |
| 8,294,404 B2 | 10/2012 | Stiesdal et al. |
| 8,314,505 B2 | 11/2012 | McLoughlin et al. |
| 8,317,126 B2 | 11/2012 | Harris et al. |
| 8,324,746 B2 | 12/2012 | Bradbrook |
| 8,350,398 B2 | 1/2013 | Butt |
| 8,362,731 B2 | 1/2013 | Smith et al. |
| 8,375,695 B2 | 2/2013 | Schilling et al. |
| 8,432,048 B1 | 4/2013 | Paulino |
| 8,469,306 B2 | 6/2013 | Kuhn, Jr. |
| 8,489,246 B2 | 7/2013 | Dooley |
| 8,492,920 B2 | 7/2013 | Huang et al. |
| 8,499,544 B2 | 8/2013 | Shafer et al. |
| 8,522,522 B2 | 9/2013 | Poisson |
| 8,536,752 B2 | 9/2013 | Katsumata et al. |
| 8,549,833 B2 | 10/2013 | Hyde et al. |
| 8,552,575 B2 | 10/2013 | Teets et al. |
| 8,568,938 B2 | 10/2013 | Gao et al. |
| 8,596,036 B2 | 12/2013 | Hyde et al. |
| 8,598,725 B1 | 12/2013 | Himmelmann |
| 8,631,657 B2 | 1/2014 | Hagen et al. |
| 8,640,439 B2 | 2/2014 | Hoffjann et al. |
| 8,657,227 B1 | 2/2014 | Bayliss et al. |
| 8,661,781 B2 | 3/2014 | Moore et al. |
| 8,672,263 B2 | 3/2014 | Stolte |
| 8,684,304 B2 | 4/2014 | Burns et al. |
| 8,689,538 B2 | 4/2014 | Sankrithi et al. |
| 8,692,489 B2 | 4/2014 | Maalioune |
| 8,723,349 B2 | 5/2014 | Huang et al. |
| 8,723,385 B2 | 5/2014 | Jia et al. |
| 8,742,605 B1 | 6/2014 | Wilhide et al. |
| 8,756,910 B2 | 6/2014 | Donovan et al. |
| 8,786,151 B1 | 7/2014 | Cole et al. |
| 8,836,158 B2 | 9/2014 | Cho et al. |
| 8,836,160 B1 | 9/2014 | Paterson et al. |
| 8,857,191 B2 | 10/2014 | Hyde et al. |
| 8,890,343 B2 | 11/2014 | Bulin et al. |
| 8,925,660 B2 | 1/2015 | Bowdich et al. |
| 8,928,166 B2 | 1/2015 | Seger et al. |
| 8,939,399 B2 | 1/2015 | Kouros et al. |
| 8,950,703 B2 | 2/2015 | Bayliss et al. |
| 8,957,539 B1 | 2/2015 | Ralston |
| 8,967,967 B2 | 3/2015 | Stretton et al. |
| 8,997,493 B2 | 4/2015 | Brust et al. |
| 8,998,580 B2 | 4/2015 | Quiroz-Hernandez |
| 9,003,811 B2 * | 4/2015 | Barnett .................. F01D 15/10 60/796 |
| 9,004,849 B2 | 4/2015 | Munsell et al. |
| 9,017,028 B2 | 4/2015 | Fabre |
| 9,024,504 B2 | 5/2015 | Nishio et al. |
| 9,038,398 B2 | 5/2015 | Suciu et al. |

(56) References Cited

U.S. PATENT DOCUMENTS

| | | |
|---|---|---|
| 9,045,996 B2 | 6/2015 | Anghel et al. |
| 9,059,440 B2 | 6/2015 | Hotto |
| 9,068,562 B1 | 6/2015 | Budica et al. |
| 9,091,316 B2 | 7/2015 | Paschen |
| 9,143,023 B1 | 9/2015 | Uskert |
| 9,160,208 B2 | 10/2015 | Murata et al. |
| 9,174,741 B2 | 11/2015 | Suntharalingam et al. |
| 9,190,892 B2 | 11/2015 | Anthony |
| 9,257,890 B2 | 2/2016 | Erd et al. |
| 9,359,082 B2 | 6/2016 | Mercier |
| 9,386,730 B2 | 7/2016 | Rodriguez et al. |
| 9,494,077 B2 | 11/2016 | Chanez et al. |
| 9,517,843 B2 | 12/2016 | Pesyna et al. |
| 9,581,233 B2 | 2/2017 | Manzoor |
| 9,611,788 B2 | 4/2017 | Sidelkovskiy |
| 9,776,714 B2 | 10/2017 | Shapery |
| 10,071,811 B2 * | 9/2018 | Kupiszewski ............ F02K 5/00 |
| 10,487,839 B2 * | 11/2019 | Kupiszewski ............ F02C 7/32 |
| 2005/0150970 A1 | 7/2005 | Beutin et al. |
| 2005/0284150 A1 * | 12/2005 | Dittmar ................ F02C 7/32 |
| | | 60/788 |
| 2006/0037325 A1 | 2/2006 | Peters et al. |
| 2006/0125243 A1 | 6/2006 | Miller |
| 2006/0137355 A1 | 6/2006 | Welch et al. |
| 2006/0138779 A1 | 6/2006 | Bouiller et al. |
| 2006/0260323 A1 | 11/2006 | Moulebhar |
| 2007/0084189 A1 | 4/2007 | Moniz et al. |
| 2008/0056892 A1 | 3/2008 | Barton et al. |
| 2008/0110151 A1 * | 5/2008 | Welch ................ F02C 7/262 |
| | | 60/39.091 |
| 2008/0110596 A1 | 5/2008 | Schwarz et al. |
| 2008/0134679 A1 | 6/2008 | Cavanaugh et al. |
| 2008/0143115 A1 | 6/2008 | Kern et al. |
| 2008/0148706 A1 * | 6/2008 | Beauregard .......... F01D 21/003 |
| | | 60/39.01 |
| 2009/0145998 A1 | 6/2009 | Salyer |
| 2009/0179424 A1 | 7/2009 | Yaron |
| 2009/0289516 A1 | 11/2009 | Hopewell et al. |
| 2009/0302717 A1 | 12/2009 | Hoffman |
| 2010/0038473 A1 | 2/2010 | Schneider et al. |
| 2010/0133835 A1 | 6/2010 | Dooley et al. |
| 2010/0207007 A1 | 8/2010 | Cottrell et al. |
| 2010/0219779 A1 | 9/2010 | Bradbrook |
| 2010/0247297 A1 | 9/2010 | Legare et al. |
| 2010/0329844 A1 | 12/2010 | Bradbrook |
| 2011/0016882 A1 | 1/2011 | Woelke et al. |
| 2011/0024555 A1 | 2/2011 | Kuhn, Jr. |
| 2011/0024567 A1 | 2/2011 | Blackwelder et al. |
| 2011/0273147 A1 | 11/2011 | Hall et al. |
| 2012/0025676 A1 | 2/2012 | Poisson |
| 2012/0086266 A1 | 4/2012 | Shipley et al. |
| 2012/0119020 A1 | 5/2012 | Burns et al. |
| 2012/0153076 A1 | 6/2012 | Burns et al. |
| 2012/0177493 A1 | 7/2012 | Fabre |
| 2012/0209456 A1 | 8/2012 | Harmon et al. |
| 2012/0214605 A1 | 8/2012 | Snook et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0062984 A1 | 3/2013 | Tremelling |
| 2013/0088019 A1 | 4/2013 | Huang et al. |
| 2013/0094963 A1 | 4/2013 | Rolt |
| 2013/0098066 A1 | 4/2013 | Gallet et al. |
| 2013/0099065 A1 | 4/2013 | Stuhlberger |
| 2013/0125561 A1 | 5/2013 | Schwarz et al. |
| 2013/0139515 A1 | 6/2013 | Schlak |
| 2013/0154359 A1 | 6/2013 | Huang et al. |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0277976 A1 | 10/2013 | Koenig |
| 2013/0306024 A1 | 11/2013 | Rolt |
| 2014/0010652 A1 | 1/2014 | Suntharalingam et al. |
| 2014/0035423 A1 | 2/2014 | Veronesi et al. |
| 2014/0060995 A1 | 3/2014 | Anderson et al. |
| 2014/0084677 A1 | 3/2014 | Haillot |
| 2014/0151495 A1 | 6/2014 | Kuhn, Jr. |
| 2014/0245748 A1 | 9/2014 | Anghel et al. |
| 2014/0250861 A1 | 9/2014 | Eames |
| 2014/0262524 A1 | 9/2014 | Valliyappan et al. |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0360206 A1 | 12/2014 | Bradbrook |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0000252 A1 | 1/2015 | Moore et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0093272 A1 | 4/2015 | Komer et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0171721 A1 | 6/2015 | Seo et al. |
| 2015/0176481 A1 | 6/2015 | Jaeger |
| 2015/0183513 A1 | 7/2015 | Gerber |
| 2015/0183522 A1 | 7/2015 | Ouellette |
| 2015/0255838 A1 | 9/2015 | Inoue et al. |
| 2015/0256051 A1 | 9/2015 | Hippen et al. |
| 2015/0284071 A1 | 10/2015 | Veilleux, Jr. et al. |
| 2015/0314865 A1 | 11/2015 | Bermond et al. |
| 2015/0380999 A1 | 12/2015 | Joshi et al. |
| 2016/0010589 A1 | 1/2016 | Rolt |
| 2016/0016670 A1 | 1/2016 | Sautreuil et al. |
| 2016/0023773 A1 | 1/2016 | Himmelmann et al. |
| 2016/0043606 A1 | 2/2016 | Chase |
| 2016/0061053 A1 | 3/2016 | Thomassin |
| 2016/0070266 A1 | 3/2016 | DiVito et al. |
| 2016/0076446 A1 | 3/2016 | Bailey Noval et al. |
| 2016/0123182 A1 | 5/2016 | Samaritano et al. |
| 2016/0144970 A1 | 5/2016 | Van Der Merwe et al. |
| 2016/0149469 A1 | 5/2016 | Lemmers et al. |
| 2016/0214727 A1 | 7/2016 | Hamel et al. |
| 2016/0332741 A1 | 11/2016 | Moxon |
| 2016/0340051 A1 | 11/2016 | Edwards et al. |
| 2016/0348589 A1 | 12/2016 | Patel et al. |
| 2016/0355272 A1 | 12/2016 | Moxon |
| 2017/0005544 A1 | 1/2017 | Pal |
| 2017/0018978 A1 | 1/2017 | Horiuchi et al. |
| 2017/0081034 A1 | 3/2017 | Marrinan et al. |
| 2017/0096231 A1 | 4/2017 | Curlier |
| 2017/0101191 A1 | 4/2017 | Becker et al. |
| 2017/0226926 A1 | 8/2017 | Army et al. |
| 2017/0267370 A1 | 9/2017 | Ullyott et al. |
| 2017/0274992 A1 | 9/2017 | Chretien |
| 2017/0291693 A1 | 10/2017 | Niergarth et al. |
| 2017/0292523 A1 | 10/2017 | Niergarth et al. |
| 2017/0297727 A1 | 10/2017 | Niergarth et al. |
| 2017/0297728 A1 | 10/2017 | Niergarth et al. |
| 2018/0023483 A1 * | 1/2018 | Le Pache ................ F16H 1/28 |
| | | 475/331 |
| 2018/0050806 A1 | 2/2018 | Kupiszewski et al. |
| 2018/0050807 A1 | 2/2018 | Kupiszewski et al. |
| 2018/0050810 A1 | 2/2018 | Niergarth et al. |
| 2018/0050811 A1 | 2/2018 | Niergarth et al. |

(56) References Cited

U.S. PATENT DOCUMENTS

| | | | |
|---|---|---|---|
| 2018/0051701 A1* | 2/2018 | Kupiszewski | ............ F02C 7/32 |
| 2018/0051702 A1* | 2/2018 | Kupiszewski | .......... F04D 25/06 |

FOREIGN PATENT DOCUMENTS

| | | | |
|---|---|---|---|
| EP | 2774853 | A1 | 9/2014 |
| FR | 3004699 | A1 | 10/2014 |
| GB | 2443743 | A | 5/2008 |
| GB | 2463957 | A | 4/2010 |
| GB | 2489311 | A | 9/2012 |
| WO | WO2010/020199 | A1 | 2/2010 |
| WO | WO2014/072615 | A1 | 5/2014 |
| WO | WO2014/123740 | A1 | 8/2014 |
| WO | WO2018/035206 | A1 | 2/2018 |

OTHER PUBLICATIONS

Aviation Week & Space Technology, Jun. 4, 2012. http://aviationweek.com/awin/boeing-researches-alternative-propulsion-and-fuel-options.

Bradley et al., "Subsonic Ultra Green Aircraft Research, Phase II: N+4 Advanced Concept Development," NASA/CR-2012-217556, May 2012.

Bouferrouk et al., Innovative Methods for the Passive and Active Control of Flow and Heat Transfer for Gas Turbine Blade Cooling, FET 07, FET_07.docx.

Schramm, Damping of Torsional Interaction Effects in Power Systems, 2010, pp. 1-132.

U.S. Appl. No. 15/354,323, filed Nov. 17, 2016.

Oh et al., Axial Flux Variable Gap Motor: Application in Vehicle Systems, Argonne National Laboratory, 2002-10-1088. http://www.autonomie.net/docs/6%20%20%Papers/CIL/axial_flux_variable_gap_motor.pdf.

Misra, Nano-Magnets and Additive Manufacturing for Electric Motors, NASA Glenn Research Center, Apr. 25, 26, 2014, Santa Rosa CA, pp. 1-21. http://ntrs.nasa.gov/archive/nasa/casi.ntrs.nasa.gov/20140010481.pdf.

Mahmoudi et al, Axial-flux permanent-magnet machine modeling, design, simulation and analysis, Scientific Research and Essays, vol. 6 (12), Jun. 18, 2011, pp. 2525-2549. www.academicjournals.org/journal/SRE/article-full-text-pdf/A6B960823151.

U.S. Appl. No. 15/354,422, filed Nov. 17, 2016.
U.S. Appl. No. 15/461,654, filed Mar. 17, 2017.
U.S. Appl. No. 15/354,370, filed Nov. 16, 2016.
U.S. Appl. No. 15/709,535, filed Sep. 20, 2017.

* cited by examiner

EMBEDDED ELECTRIC MACHINE

FIELD

The present subject matter relates generally to a gas turbine engine having an embedded electric machine, and to a propulsion system for an aeronautical device including the same.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For certain aircraft, it may be beneficial for the propulsion system to include an electric fan to supplement propulsive power provided by the one or more gas turbine engines included with the propulsion system. However, providing the aircraft with a sufficient amount of energy storage devices to power the electric fan may be space and weight prohibitive. Notably, certain gas turbine engines may include auxiliary generators positioned, e.g., within a cowling of the gas turbine engine. However, these auxiliary generators may not be configured to provide a sufficient amount of electrical power to adequately drive the electric fan.

Accordingly, a propulsion system for an aircraft including one or more electric machines embedded within the gas turbine engine would be useful. Notably, however, the inventors of the present disclosure have discovered that a useful life span of typical electric machines is less than that of a gas turbine engine. Accordingly, the electric machines embedded within the gas turbine engines may need to be repaired or replaced more frequently than the gas turbine engines themselves. However, in order to replace an embedded electric machine, the gas turbine engine must be taken off wing and disassembled to expose the electric machine and install a new electric machine. Such a set up may be timely and cost inefficient. Therefore, an improved gas turbine engine with an embedded electric machine would be useful, and a propulsion system including the same would also be beneficial.

BRIEF DESCRIPTION

Aspects and advantages of the invention will be set forth in part in the following description, or may be obvious from the description, or may be learned through practice of the invention.

In one exemplary aspect of the present disclosure, a method is provided for maintaining a gas turbine engine installed on an aircraft, the gas turbine engine including an electric machine mounted at least partially inward of a core air flowpath of the gas turbine engine. The method includes removing a rotor mount connecting a rotor of the electric machine to a rotary component of the gas turbine engine; removing a stator mount connecting a stator of the electric machine to a stationary component of the gas turbine engine; and removing in situ the electric machine.

For example, in certain exemplary aspects the method further includes removing a cover assembly to expose the rotor mount, the stator mount, or both.

For example, in certain exemplary aspects the cover assembly includes an aft cone and a cavity wall.

In certain exemplary aspects removing the rotor mount includes removing a mechanical connector connecting a shaft extension member to the rotor of the electric machine.

For example, in certain exemplary aspects removing the rotor mount further includes moving the shaft extension member at least partially along an axial direction of the gas turbine engine to decouple the shaft extension member from the rotary component of the gas turbine engine at a splined connection.

In certain exemplary aspects removing in situ the electric machine includes disconnecting the electric machine from an electric communication bus.

For example, in certain exemplary aspects disconnecting the electric machine from the electric communication bus includes electrically disconnecting the electric machine from the electric communication bus at a quick release electric connection.

In certain exemplary aspects the gas turbine engine extends between a forward end and an aft end, and wherein the electric machine is positioned at the aft end of the gas turbine engine.

For example, in certain exemplary aspects the electric machine defines an aft end, and wherein the rotor mount, the stator mount, or both are positioned proximate the aft end of the electric machine.

In certain exemplary aspects the electric machine is a first electric machine, and wherein the method further includes installing in situ a second electric machine in place of the first electric machine.

For example, in certain exemplary aspects the method further includes connecting a rotor of the second electric machine to the rotary component of the gas turbine engine using the rotor mount; and connecting a stator of the second electric machine to the stationary component of the gas turbine engine using the stator mount.

In an exemplary embodiment of the present disclosure, a gas turbine engine defining a radial direction and an axial direction is provided. The gas turbine engine includes a turbomachine including a compressor, a turbine, a rotary component rotatable with the compressor and the turbine, and a stationary component, the compressor and turbine together defining at least in part a core air flowpath; an electric machine positioned at least partially inward of the core air flowpath along the radial direction, the electric machine including a rotor and a stator; a rotor mount removably coupling the rotor of the electric machine to the rotary component; a stator mount removably coupling the stator of the electric machine to the stationary component; and a cover assembly removably positioned over the electric machine, the electric machine and cover assembly positioned such that the electric machine is removable from the gas turbine engine in situ when the cover assembly is removed.

In certain exemplary embodiments the cover assembly includes an aft cone and a cavity wall.

In certain exemplary embodiments the cover assembly consists essentially of an aft cone and a cavity wall.

In certain exemplary embodiments the gas turbine engine further includes an electric communication bus; and a quick electric connection, the electric machine electrically connected to the electric communication bus through the quick electric connection.

In certain exemplary embodiments the gas turbine engine defines an aft end, and wherein the electric machine is positioned proximate the aft end.

In certain exemplary embodiments at least a portion of the cover assembly is visible from an outside of the gas turbine engine.

In certain exemplary embodiments the gas turbine engine further includes an electric machine mount coupled to, or formed integrally with, the stationary component of the turbomachine, and wherein the electric machine is slidably received on the electric machine mount.

In certain exemplary embodiments the stator mount fixedly couples the electric machine to the electric machine mount.

In certain exemplary embodiments the gas turbine engine further includes a shaft extension member extending between a first end and a second end, wherein the first end is coupled to the rotary component of the turbomachine through a splined connection, and wherein the second end is coupled to the rotor of the electric machine by the rotor mount.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
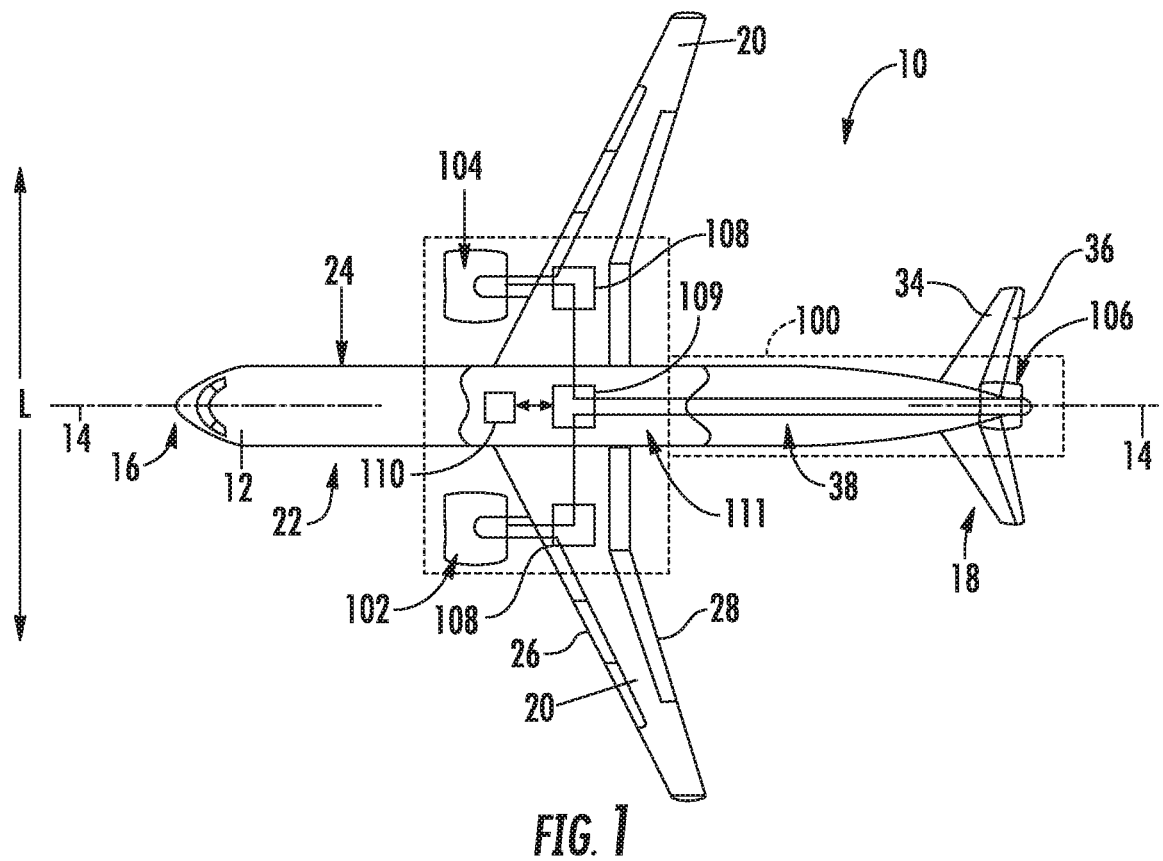
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
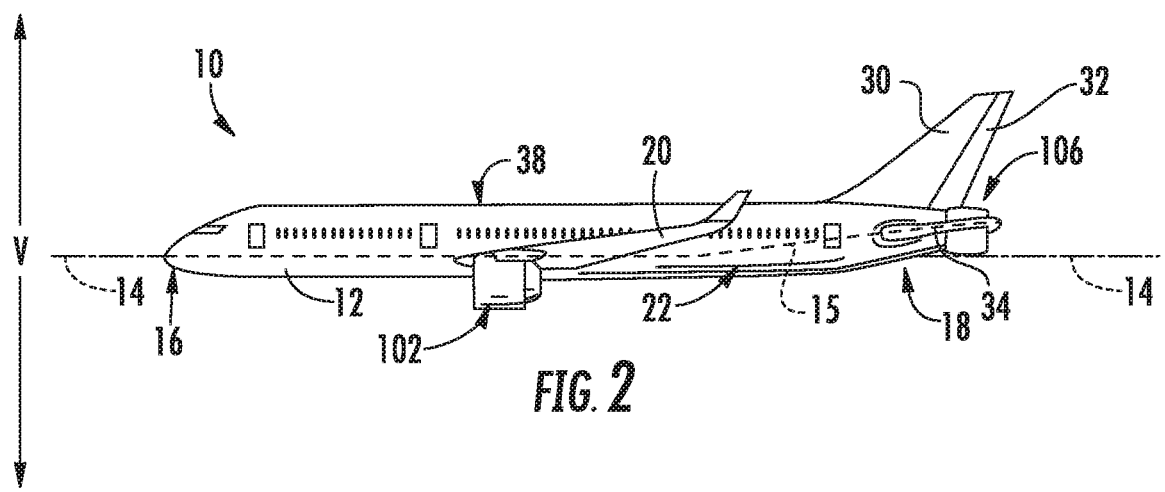
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having any other suitable propulsion system 100 configured in any other suitable manner. For example, it should be appreciated that in various other embodiments, the BLI fan 106 may alternatively be positioned at any suitable location proximate the aft end 18 of the aircraft 10. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine." Moreover, in other embodiments, the electric propulsion engine may not be a boundary layer ingestion fan, and instead may be mounted at any suitable location on the aircraft 10 as a freestream injection fan. Furthermore, in still other embodiments, the propulsion system 100 may not include, e.g., the power conditioner 109 and/or the energy storage device 110, and instead the generator(s) 108 may be directly electrically connected to the BLI fan 106.

Figure 3:
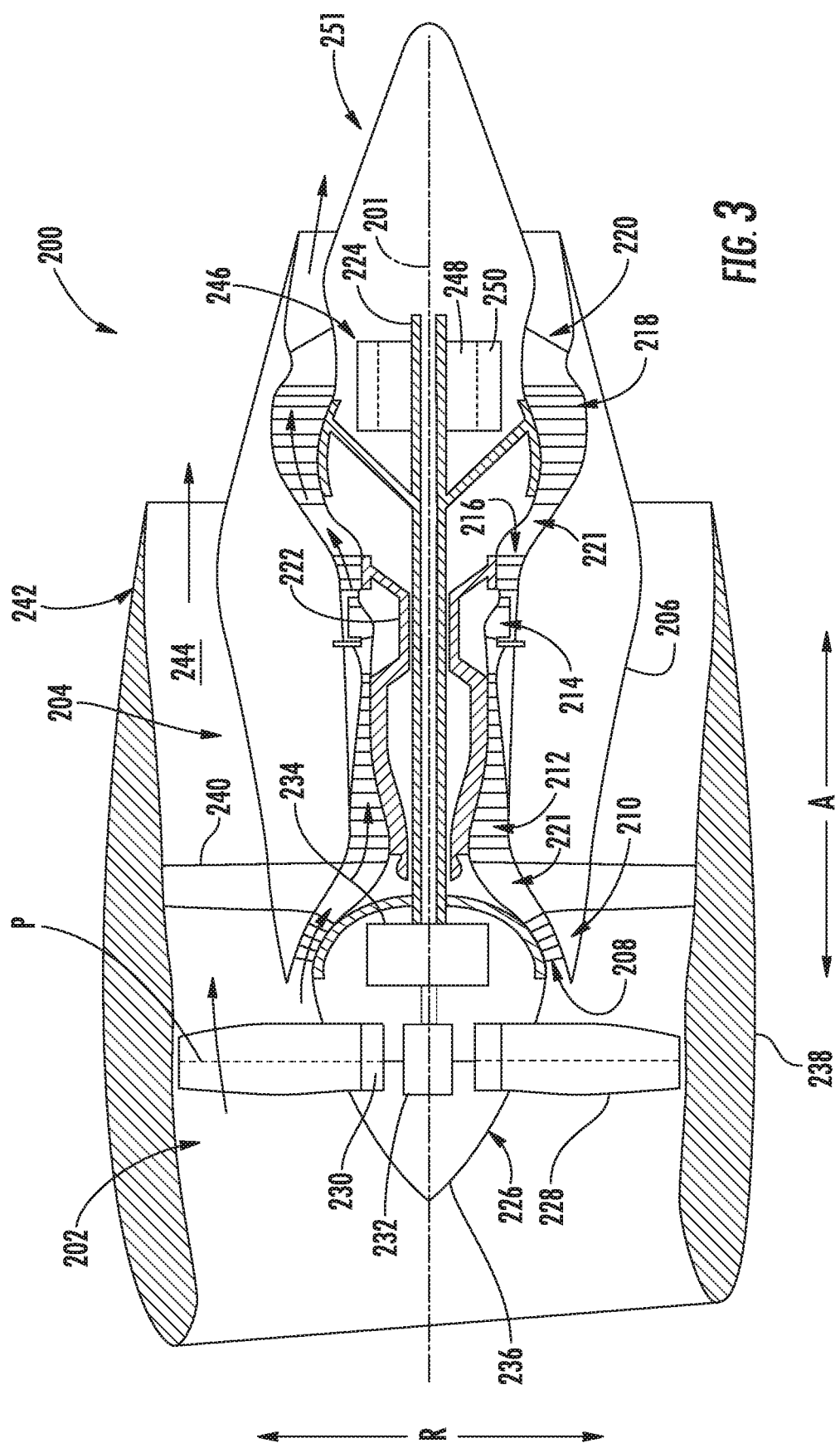
FIG. 3 is a schematic, cross-sectional view of a gas turbine engine in accordance with an exemplary aspect of the present disclosure.

Referring now to FIG. 3, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 102, 104 may be also configured as high-bypass turbofan jet engines. In various embodiments, the turbofan 200 may be representative of jet engines 102, 104. Alternatively, however, in other embodiments, the turbofan 200 may be incorporated into any other suitable aircraft 10 or propulsion system 100.

As shown in FIG. 3, the turbofan 200 defines an axial direction A (extending parallel to a longitudinal centerline 201 provided for reference), a radial direction R, and a circumferential direction C (extending about the axial direction A; not depicted in FIG. 3). In general, the turbofan 200 includes a fan section 202 and a turbomachine 204 disposed downstream from the fan section 202.

The exemplary turbomachine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a core air flowpath 221 extending from the annular inlet 208 through the LP compressor 210, HP compressor 212, combustion section 214, HP turbine section 216, LP turbine section 218 and jet nozzle exhaust section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the turbomachine 204. The nacelle 238 is supported relative to the turbomachine 204 by a plurality of circumferentially-spaced outlet guide vanes 240. A downstream section 242 of the nacelle 238 extends over an outer portion of the turbomachine 204 so as to define a bypass airflow passage 244 therebetween.

Additionally, the exemplary turbofan 200 depicted includes an electric machine 246 rotatable with the fan 226. Specifically, for the embodiment depicted, the electric machine 246 is configured as an electric generator co-axially mounted to and rotatable with the LP shaft 224 (the LP shaft 224 also rotating the fan 226 through, for the embodiment depicted, the power gearbox 234). As used herein, "co-axially" refers to the axes being aligned. It should be appreciated, however, that in other embodiments, an axis of the electric machine 246 may be offset radially from the axis of the LP shaft 224 and further may be oblique to the axis of the LP shaft 224, such that the electric machine 246 may be positioned at any suitable location at least partially inward of the core air flowpath 221.

The electric machine 246 includes a rotor 248 and a stator 250. In certain exemplary embodiments, the rotor 248 and stator 250 of the electric machine 246 are configured in substantially the same manner as the exemplary rotor and stator of the electric machine described below. Notably, when the turbofan engine 200 is integrated into the propulsion system 100 described above with reference to FIGS. 1 and 2, the electric generators 108 may be configured in substantially the same manner as the electric machine 246 of FIG. 3.

Further, for the embodiment depicted, the gas turbine engine, or rather, the turbofan engine 200, additionally includes a cover assembly 251 removably positioned over the electric machine 246. The electric machine 246 and cover assembly 251 are positioned such that the electric machine 246 is removable from the gas turbine engine (i.e., the turbofan engine 200) in situ when the cover assembly 251 is removed. It will be appreciated, that as used herein, the term "in situ," with reference to a particular task or operation, refers to such task or operation being completed with the engine still installed on or in the aircraft.

It should be also appreciated, however, that the exemplary turbofan engine 200 depicted in FIG. 3 is provided by way of example only, and that in other exemplary embodiments, the turbofan engine 200 may have any other suitable configuration. For example, in other exemplary embodiments, the turbofan engine 200 may be configured as a turboprop engine, a turbojet engine, a differently configured turbofan engine (e.g., direct drive engine, fixed-pitch engine, etc.), or any other suitable gas turbine engine.

Figure 4:
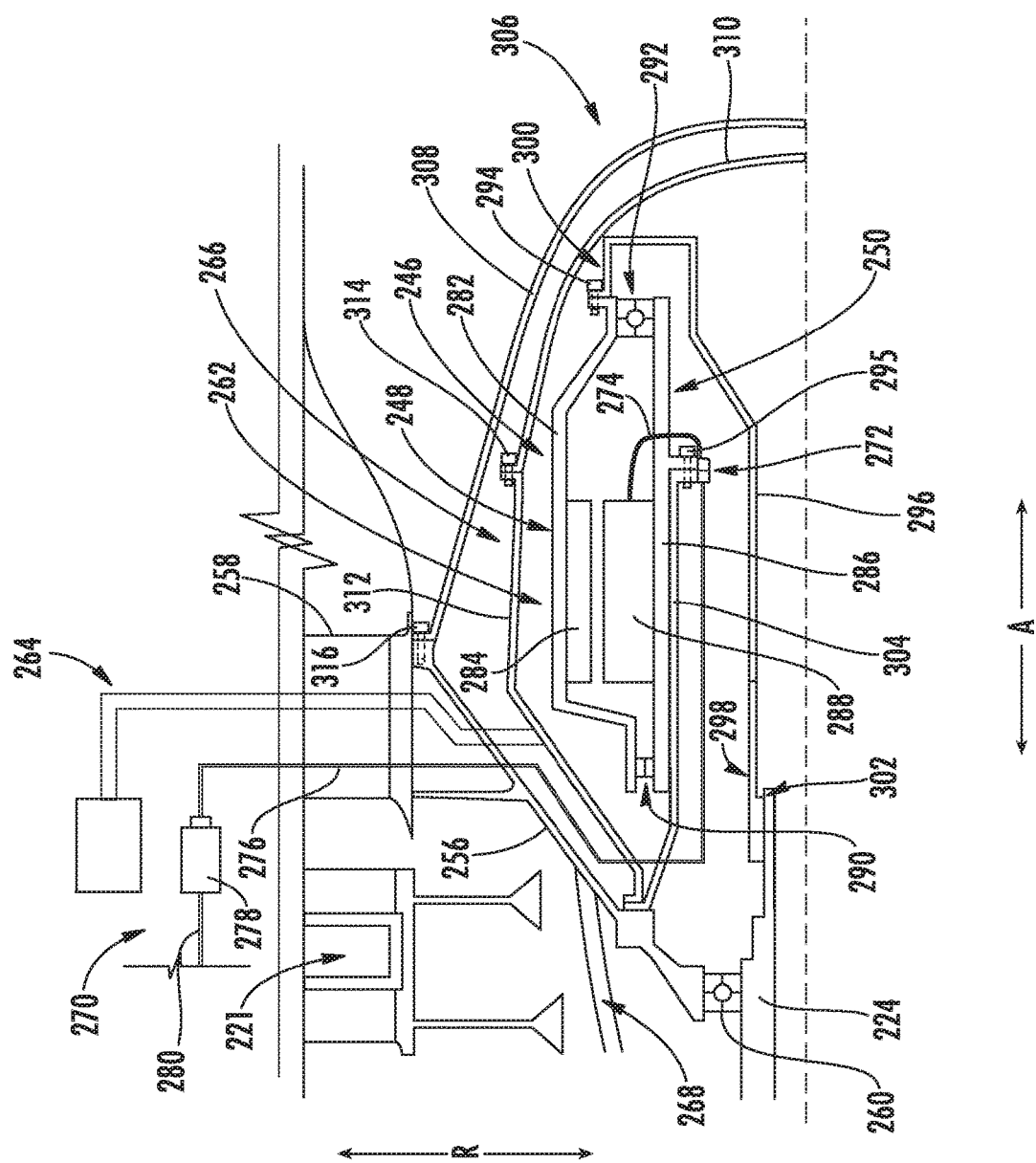
FIG. 4 is a schematic, cross-sectional view of an electric machine embedded in a gas turbine engine in accordance with an exemplary embodiment of the present disclosure.

Referring now to FIG. 4, an electric machine 246 embedded within a gas turbine engine in accordance with an exemplary embodiment of the present disclosure is depicted. More particularly, for the embodiment depicted, the electric machine 246 is embedded within a turbine section of the gas turbine engine, at a location inward of a core air flowpath 221 of the gas turbine engine. Additionally, the electric machine 246 is positioned at least partially within or aft of the turbine section along an axial direction A. In certain exemplary embodiments, the electric machine 246 and gas turbine engine depicted in FIG. 4 may be configured in substantially the same manner as the exemplary electric machine 246 and turbofan engine 200 described above with reference to FIG. 3. Accordingly, the same or similar numbers may refer to the same or similar parts.

Moreover, it will be appreciated that the gas turbine engine generally includes a rotary component and a stationary component. The rotary component is rotatable with a compressor within a compressor section (not shown) of the gas turbine engine and a turbine within the turbine section of the gas turbine engine. By contrast, the stationary component may be any suitable component which is configured to remain stationary relative to the various rotating components of the compressors and turbines.

As with the embodiment above, the electric machine 246 generally includes a rotor 248 and a stator 250. The rotor 248 of the electric machine 246 is coupled to the rotary component of the gas turbine engine and the stator 250 of the electric machine 246 is coupled to the stationary component of the gas turbine engine. More particularly, for the embodiment depicted the rotary component to which the rotor 248 of the electric machine 246 is coupled is an LP shaft 224 of the gas turbine engine, such that the rotor 248 is rotatable with the LP shaft 224. By contrast, the stationary component to which the stator 250 of the electric machine 246 is coupled is a structural support member 256 of the turbine section. The connection between the rotor 248 of the electric machine 246 and the rotary component of the gas turbine engine, as well as the stator 250 of the electric machine 246 to the stationary component of the gas turbine engine will be described in greater detail below.

Referring still to the exemplary electric machine 246 of FIG. 4, the structural support member 256 is configured as part of an aft frame assembly and extends from an aft frame strut 258 of the aft frame assembly of the gas turbine engine. The aft strut 258 extends through the core air flowpath 221 of the gas turbine engine, and is configured to provide structural support for the gas turbine engine. The structural support member 256 also extends forward to support an aft engine bearing 260—the aft engine bearing 260 rotatably supporting an aft end of the LP shaft 224.

Further, the gas turbine engine defines an electric machine sump 262. The electric machine sump 262 extends from a location forward of the electric machine 246 continuously to a location aft of the electric machine 246. Moreover, the gas turbine engine depicted includes an electric machine lubrication system 264, with the electric machine lubrication system 264 in fluid communication with the electric machine sump 262, for providing a thermal fluid to the electric machine sump 262. For the embodiment depicted, the electric machine lubrication system 264 may operate independently of a gas turbine engine lubrication system.

In order to further maintain a temperature of the electric machine 246, the cooling system of the exemplary gas turbine engine depicted further includes a buffer cavity 266 surrounding at least a portion of the electric machine 246. The buffer cavity 266 may further thermally insulate the electric machine 246. The buffer cavity 266, for the embodiment depicted, extends continuously from a location forward of the electric machine 246 to a location aft of the electric machine 246 along the axial direction A. The buffer cavity 266 may act as an insulator from relatively hot operating temperatures within the core air flowpath 221 extending through the turbine section of the gas turbine engine.

Furthermore, for the embodiment depicted, the gas turbine engine includes a cooling duct 268. The cooling duct 268 is in airflow communication with the buffer cavity 266 for providing a cooling airflow to the buffer cavity 266. For example, in the embodiment depicted, the cooling duct 268 defines an outlet (not labeled) extending through the structural support member 256 for providing the cooling airflow from the cooling duct 268 through the structural support member 256 and into the buffer cavity 266. The cooling duct 268 may also be in airflow communication with a relatively cool air source for providing the cooling airflow. In certain exemplary embodiments, the cool air source may be a compressor section of the gas turbine engine (wherein the cooling airflow may be diverted from the compressor section), or a fan of the gas turbine engine (wherein the cooling airflow may be diverted from the fan).

It will be appreciated that the electric machine lubrication system 264, cooling duct 268, and buffer cavity 266 are each configured as part of the cooling system for maintaining at least certain components of the electric machine 246 within a desired temperature range. For example, when one or more permanent magnets are included with the electric machine 246, the cooling system may maintain such components below a Curie temperature limit for the plurality of permanent magnets, or below a predetermined buffer of the Curie temperature limit.

Referring still to the embodiment of FIG. 4, as briefly discussed above during operation of the gas turbine engine, the LP shaft 224 may rotate the rotor 248 of the electric machine 246, allowing electric machine 246 to function as an electric generator producing electrical power. Additionally, the electric machine 246 is in electrical communication with—i.e. electrically connected to—an electric communication bus 270. The electric communication bus 270 is electrically connected to the electric machine 246 at a location radially inward of the core air flowpath 221.

Specifically, for the embodiment depicted, the electric communication bus 270 includes a first electrical connection 272, which as will be described in greater detail below may be a quick electrical connection. More specifically, the first electrical connection 272 receives an electrical line 274 from the electric machine 246 (for the embodiment depicted, from the stator 250 of the electric machine 246) and connects the electric line 274 to an intermediate section 276 of the electric communication bus 270. The intermediate section 276 extends through the core air flowpath 221 to a second electrical connection 278 mounted at a location radially outward of the core air flowpath 221, e.g., within a cowling of the gas turbine engine. The second electrical connection 278 connects the intermediate section 276 of the electric communication bus 270 to an outlet line 280 of the electric communication bus 270 for connection to one or more systems of the gas turbine engine and/or aircraft with which the gas turbine engine is installed.

As stated and depicted in FIG. 4, at least a portion of the electric communication bus 270 extends through the core air flowpath 221. More specifically, for the embodiment depicted, the intermediate section 276 of the electric communication bus 270 extends through the core air flowpath 221 at a location downstream of a combustion section of the gas turbine engine (such as the combustion section 214 of the exemplary turbofan engine 200 of FIG. 3). In particular, the intermediate section 276 extends through/is positioned within the aft strut 258.

It should be appreciated, however, that in other exemplary embodiments, the electric communication bus 270 may have any other suitable configuration for transferring electrical power from the electric machine 246 located radially inward from the core air flowpath 221 to a location radially outward of the core air flowpath 221.

Referring particularly to the exemplary electric machine 246 depicted, for the embodiment shown, and as stated, the electric machine 246 generally includes a rotor 248 and a stator 250. The rotor 248 includes a rotor support 282 and, for the embodiment depicted, a plurality of rotor magnets 284. The stator 250 similarly includes a stator support 286 and, for the embodiment depicted, a plurality of coils 288. Of course, in other embodiments of the electric machine 246, the rotor 248 and stator 250 may have any other suitable configuration for, e.g., converting rotational power from the rotary component of the gas turbine engine to electrical power.

As is depicted, the exemplary electric machine 246 further includes a forward bearing 290 located forward of the rotor magnets 284 and stator coils 288 and an aft bearing 292 located aft of the rotor magnets 284 and stator coils 288. The forward bearing 290 and aft bearing 292 are each configured to rotatably support the rotor support 282 relative to the stator support 286. For the embodiment depicted, the forward bearing 290 is configured as a single roller bearing and the aft bearing 292 is configured as a single ball bearing. However, in other embodiments, any other suitable type of bearing and/or combination of bearings may be provided for the forward bearing 290 and/or the aft bearing 292. Additionally, in other embodiments, the electric machine 246 may have any other suitable bearing configuration.

As also noted above, the rotor 248 of the electric machine 246 is coupled to the rotary component of the gas turbine engine (or rather of a turbomachine of the gas turbine engine; see FIG. 3) and the stator 250 of the electric machine 246 is coupled to the stationary component of the gas turbine engine (or rather of the turbomachine of the gas turbine engine). For the embodiment depicted, the gas turbine engine further includes a rotor mount 294 removably coupling the rotor 248 of the electric machine 246 to the rotary component and a stator mount 295 removably coupling the stator 250 of the electric machine 246 to the stationary component.

More specifically, for the embodiment depicted, the gas turbine engine further includes a shaft extension member 296 extending between a first end 298 and a second end 300. As noted, for the embodiment depicted, the rotary component is the LP shaft 224 of the gas turbine engine. The first end 298 of the shaft extension member 296 is coupled to the LP shaft 224 of the gas turbine engine through a splined connection 302. In such a manner, it will be appreciated that the first end 298 of the shaft extension member 296 may be moveably/slidably received onto the LP shaft 224 (i.e., slidable along the axial direction A), and fixed along a circumferential direction (i.e., such that the first end 298 of the shaft extension member 296 is not movable relative to the LP shaft 224 along the circumferential direction; the circumferential direction being a direction extending about the axial direction A).

Further, the second end 300 of the shaft extension member 296 is coupled to the rotor 248 of the electric machine 246 by the rotor mount 294, and more specifically, is coupled to the rotor support 282 of the electric machine 246 by the rotor mount 294. For the embodiment depicted, the rotor mount 294 is a mechanical coupling joining the rotor support 282 with the second end 300 of the shaft extension member 296. More specifically, for the embodiment depicted, the rotor mount 294 is a bolt extending at least partially through the rotor support 282 and the second end 300 of the shaft extension member 296, and more specifically still, is a plurality of bolts spaced along the circumferential direction, with each bolt extending at least partially through the rotor support 282 and the second end 300 of the shaft extension member 296.

It will be appreciated, however, that in other exemplary embodiments, any other suitable rotor mount 294 may be utilized. For example, in other embodiments, the rotor mount 294 may be one or more screws, one or more clips, one or more clamps, corresponding features on the second end 300 of the shaft extension member 296 and the rotor support 282, etc. Additionally, although for the embodiment depicted, the first end 298 of the shaft extension member 296 is coupled with the LP shaft 224 through the splined connection 302, in other embodiments, the shaft extension member 296 may be coupled to the LP shaft 224 in a fixed manner along the axial direction A in any suitable manner. However, by utilizing the splined connection 302 between the shaft extension member 296 and the LP shaft 224, a removeability of such component is increased, as will be discussed below. For example, in other exemplary embodiments, the shaft extension member 296, or other mounting structure not shown, may be configured to facilitate an "off-axis" mounting of the electric machine 246. For example, the shaft extension member 292 may be coupled to a bevel gear assembly, a compound gear set, etc. allowing the electric machine 246 to rotate about an axis different than the axis 201 of the gas turbine engine (as is the case with the embodiment depicted). In such a case, the electric machine 246 may rotate about an axis offset, but parallel to, the axis 201 of the gas turbine engine, or may rotate about an axis defining an angle between, e.g., 0 and ninety degrees with the axis 201 of the gas turbine engine.

Furthermore for the embodiment depicted in FIG. 4, the gas turbine engine further includes an electric machine mount 304 coupled to, or formed integrally with, the stationary component of the gas turbine engine (or rather of the turbomachine of the gas turbine engine). More specifically, the electric machine mount 304 is fixedly coupled to the stationary component of the gas turbine engine, and more specifically still, is fixedly coupled to the structural support member 256 of the gas turbine engine.

The electric machine mount 304, for the embodiment depicted, includes at least a portion extending generally along the axial direction A of the gas turbine engine. As will be appreciated more fully from the discussion of the Figs. below, for the embodiment shown, the electric machine 246 is slidably received on the electric machine mount 304, and the stator mount 295 fixedly couples the electric machine 246 to the electric machine mount 304. More specifically, for the embodiment depicted, the stator support 286 of the electric machine 246 is slidably received, along the axial direction A of the gas turbine engine, on the electric machine mount 304 and the stator mount 295 fixedly couples the stator support 286 of the stator 250 to the electric machine mount 304.

Similar to the rotor mount 294, for the embodiment depicted, the stator mount 295 is configured as a mechanical coupling joining the stator support 286 with the electric machine mount 304. More specifically, for the embodiment depicted, the stator mount 295 is a bolt extending at least partially through the stator support 286 and the electric machine mount 304 (or rather, respective flanges of the stator support 286 and the electric machine mount 304), and more specifically still, is a plurality of bolts spaced along the circumferential direction, with each bolt extending at least partially through the stator support 286 and the electric machine mount 304. It will be appreciated, however, that in other exemplary embodiments, any other suitable stator mount 295 may be utilized. For example, in other embodiments, the stator mount 295 may be one or more screws, one or more clips, one or more clamps, corresponding features on the electric machine mount 304 and the stator support 286, etc.

Also for the embodiment depicted, the gas turbine engine further includes a cover assembly 306 removably positioned over the electric machine 246. As will be appreciated more fully from the discussion below, the electric machine 246 and cover assembly 306 are positioned such that the electric machine 246 is removable from the gas turbine engine in situ when the cover assembly 306 is removed.

For the embodiment depicted, the cover assembly 306 generally includes an aft cone 308 and a cavity wall 310. More specifically, for the embodiment depicted, the cover assembly 306 essentially only includes the aft cone 308 and the cavity wall 310. The term "aft cone" as used herein refers to any aerodynamic cowling positioned generally at the aft end of the engine. The cavity wall 310 surrounds at least a portion of the electric machine 246. More specifically, for the embodiment depicted, the cavity wall 310 is coupled to an extension member 312, with the extension member 312, in turn, coupled to the structural support member 256. The cavity wall 310 and extension member 312 together substantially completely define a radially outer bound the electric machine sump 262. Notably, the cavity wall 310 is connected to the extension member 312 at a cavity wall joint using a cavity wall mount 314. The cavity wall joint is located outward of the electric machine 246 along the radial direction R. Additionally, the cavity wall mount 314 is, for the embodiment depicted, a mechanical coupling, and more specifically, is a bolt extending at least partially through a flange of the cavity wall 310 and a flange of the extension member 312. More specifically still, the cavity wall mount 314 is configured as a plurality of bolts spaced along the circumferential direction. However, as with the rotor mount 294 and stator mount 295, in other embodiments, the cavity wall mount 314 may have any other suitable configuration for joining the cavity wall 310 to the extension member 312, or any other suitable stationary component of the gas turbine engine (or rather, of the turbomachine of the gas turbine engine).

Similarly, the aft cone 308 also surrounds least a portion of the electric machine 246. The aft cone 308, for the embodiment depicted, defines at least in part the buffer cavity 266 described above. Moreover, the aft cone 308 is, for the embodiment depicted, coupled to the stationary component of the gas turbine engine (or rather, of the turbomachine of the gas turbine engine), and more specifically, to the structural support member 256. More specifically, still, the aft cone 308 is coupled to the structural support member through an aft cone mount 316 at an aft cone joint. The aft cone joint is located outward of the electric machine 246 along the radial direction R, and further, for the embodiment depicted, is located outward of the cavity wall joint along the radial direction R.

Additionally, the aft cone mount 316 is, for the embodiment depicted, a mechanical coupling, and more specifically, is a bolt extending at least partially through a flange of the aft cone 308 and a flange of the structural support member 256. More specifically still, the cavity wall mount 314 is configured as a plurality of bolts spaced along the circumferential direction. However, as with the rotor mount 294 and stator mount 295, in other embodiments, the cavity wall mount 314 may have any other suitable configuration for joining the aft cone 308 to the structural support member 256, or any other suitable stationary component of the gas turbine engine (or rather, of the turbomachine of the gas turbine engine).

As will be appreciated from the present disclosure, for the embodiment shown, at least a portion of the cover assembly 306 is visible from an outside of the gas turbine engine (see also, e.g., FIG. 3). More specifically, substantially all of the aft cone 308 is visible from an outside of the gas turbine engine for the embodiment depicted. It will be appreciated, that as used herein, the term "visible form an outside" with respect to a component of a gas turbine engine, refers to such component defining a clear, straight line of sight to the outside of the gas turbine engine. In such a manner, the electric machine 246 may be relatively easily replaced in the event the electric machine 246 fails or otherwise deteriorates more rapidly than the gas turbine engine.

Figure 5:
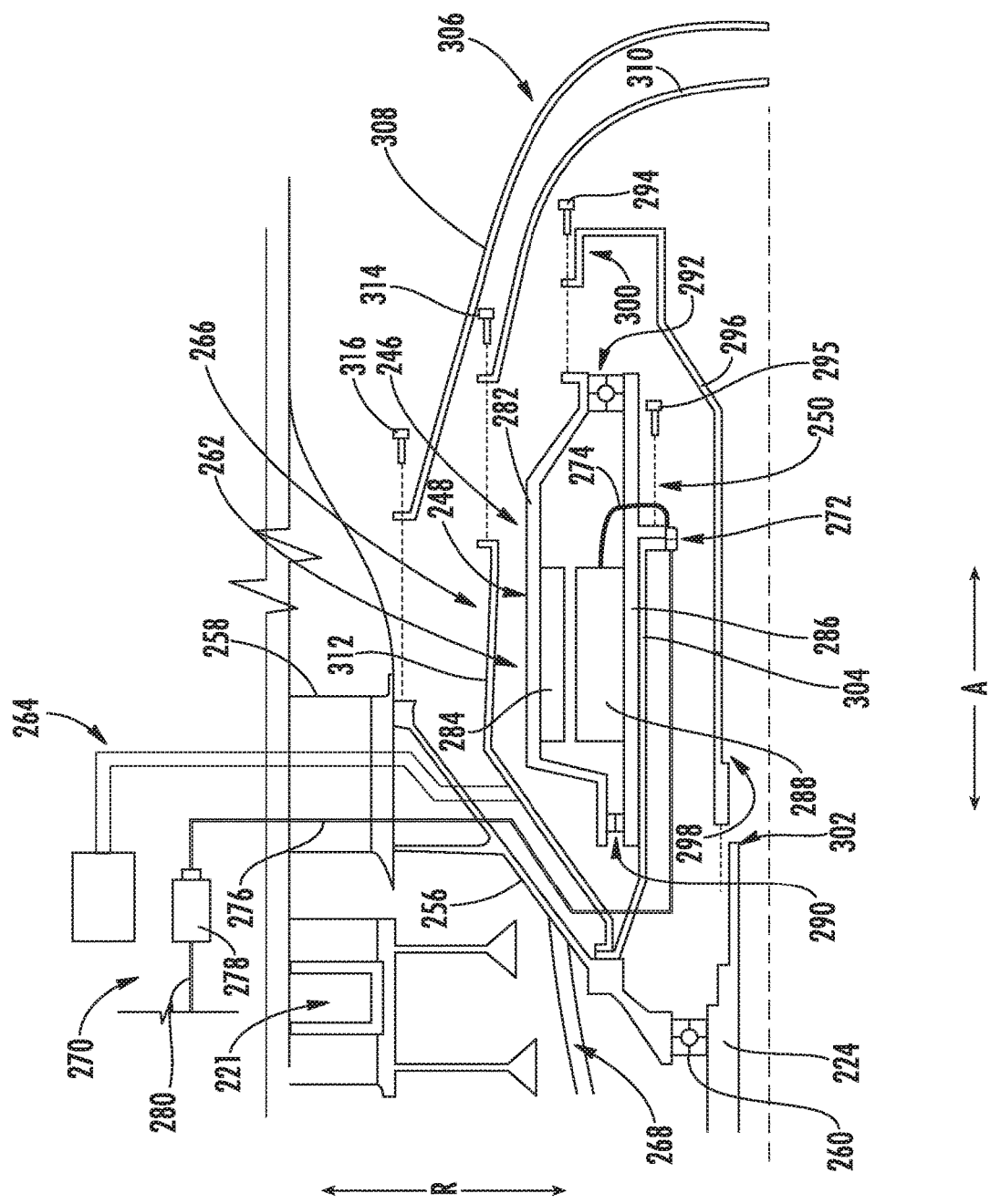
FIG. 5 is a schematic, cross-sectional view of an electric machine embedded in the exemplary gas turbine engine of FIG. 4 partially disassembled.

For example, referring now to FIG. 5, it will be appreciated that for the embodiment depicted, the electric machine 246 may generally be removed from the gas turbine engine in situ generally by removing the cover assembly 306, the rotor mount 294, and stator mount 295. More specifically, as is illustrated in FIG. 5, the cover assembly 306 may first be removed, and more specifically still, the aft cone mount 316 may be removed to remove the aft cone 308 and the cavity wall mount 314 may be removed to remove the cavity wall 310. With the removal of the cover assembly 306, and more specifically, of the aft cone 308 and the cavity wall 310, the rotor mount 294 is exposed. The rotor mount 294 may be removed, allowing for the shaft extension member 296 to be removed. As noted above, the first end 298 of the shaft extension member 296 is coupled to the rotary components of the turbomachine through the splined connection 302. In such a manner, the shaft extension member 296 may be relatively easily removed from the rotary component by sliding the shaft extension member 296 generally along the axial direction A. However, in other embodiments, the shaft extension member 296 may be coupled to the rotary component in any other suitable manner.

Figure 6:
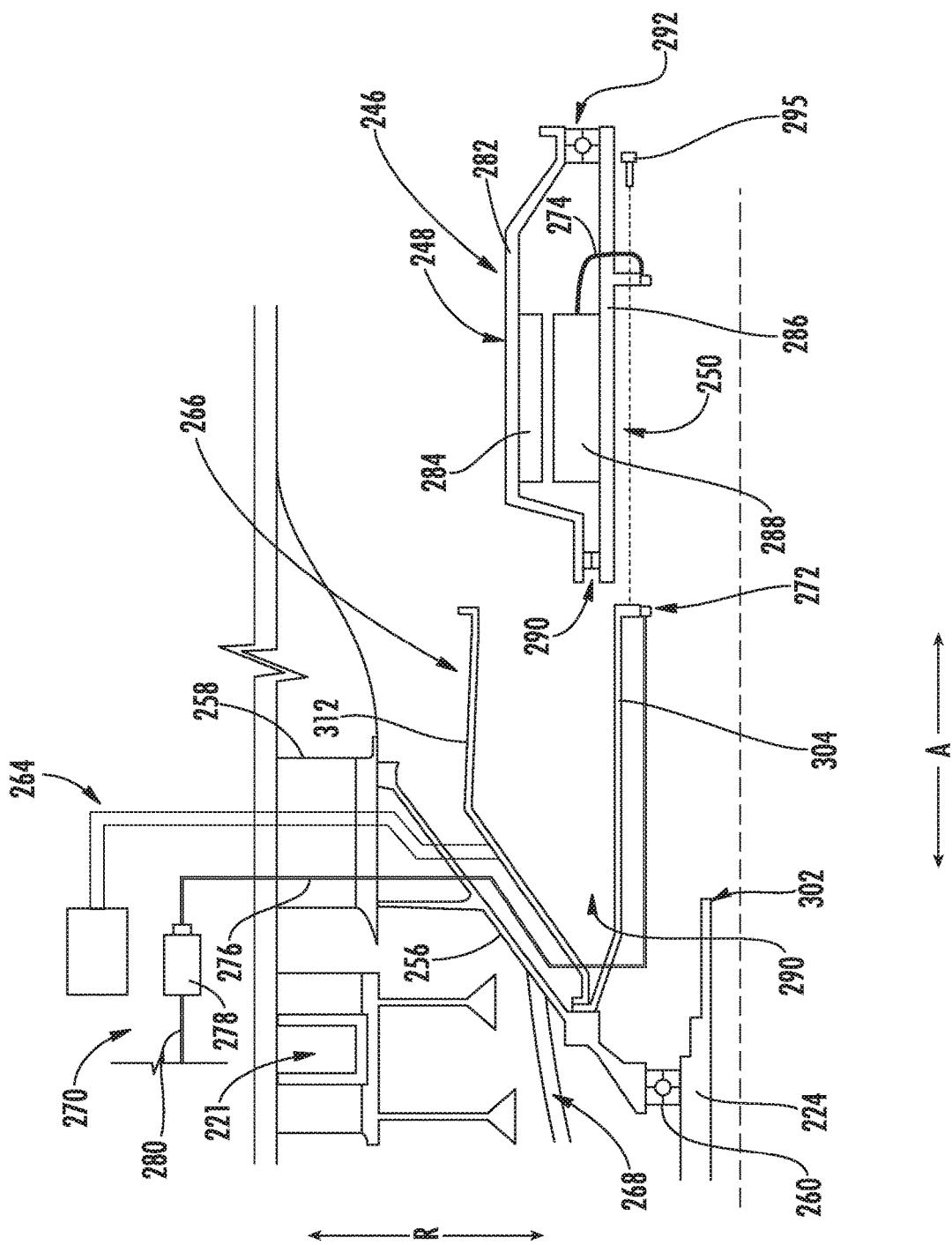
FIG. 6 is another schematic, cross-sectional view of an electric machine embedded in the exemplary gas turbine engine of FIG. 4 partially disassembled.

Referring now particularly to FIG. 6, with the cover assembly 306 removed and with the rotor mount 294 and shaft extension member 296 removed, the stator mount 295 is exposed. The stator mount 295 may then be removed and the electric machine 246 may be slidably removed from the electric machine mount 304. In such a manner, the electric machine 246 may be relatively easily removed or uninstalled from the gas turbine engine in situ, such that the gas turbine engine may not need to be taken off wing (i.e., uninstalled from the aircraft) and substantially disassembled to expose the electric machine 246 and repair or replace the electric machine 246. With the electric machine 246 removed, a new, second electric machine 246 may be installed in a reverse order than that discussed above.

It will be appreciated, that the exemplary electric machine 246 depicted may be removed as a unit from the gas turbine engine. For example, the rotor 248 and stator 250 may be removed together, with the stator support 286 and rotor support 282 still coupled through the bearings 290, 292. Such a configuration may assist with the installation/removal of an electric machine 246 within the gas turbine engine, as the bearings 290, 292 will not need to be mounted directly to a stationary component of the gas turbine engine (i.e., that is not removed as part of the disclosed removal process).

Figure 7:
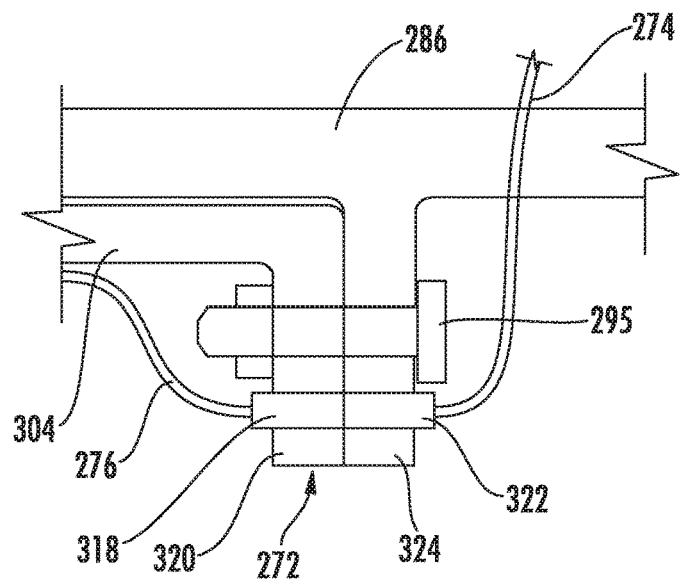
FIG. 7 is a schematic, close up view of a stator mount and quick electrical connection in accordance with an exemplary embodiment of the present disclosure.

Notably, referring generally to FIGS. 4 through 6, it will be appreciated that for the embodiment depicted, the first electrical connection 272, as noted above, is a quick electrical connection. In such a manner, the electric machine 246 may be removed and electrically disconnected from the electric communication bus 270 of the gas turbine engine without use of tools. For example, referring particularly to FIG. 7, a close-up, schematic view of the stator mount 295 coupling the stator support 286 to the electric machine mount 304 and the first electrical connection 272 is provided. For the embodiment depicted, the first electrical connection 272 includes a first member 318 coupled to or positioned within a flange 320 of the electric machine mount 304 and a second member 322 coupled to or positioned within a flange 324 of the stator support 286. When the stator mount 295 couples the stator support 286 to the electric machine mount 304, the first member 318 and second member 322 of the first electrical connection 272 are positioned together to electrically connect the electric line 274 of the electric machine 246 to the electric communication bus 270. The first member 318 and second member 322 of the first electrical connection 272 may be electrically connected and electrically disconnected without use of any tools. For example, the first member 318 may be fixedly coupled to the flange 320 of the electric machine mount 304 and the second member 322 may be fixedly coupled to the flange 322 of the stator support 286. In such a manner, the first and second members 318, 322 may be automatically decoupled and recoupled with the removal and replacement, respectively, of an electric machine 246. Such may allow for an easier removal of the electric machine 246 and/or installation of a new electric machine 246.

Figure 8:
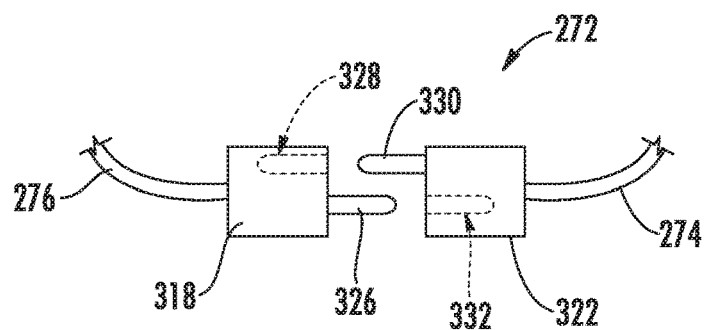
FIG. 8 is another schematic view of the exemplary quick electric electrical connection of FIG. 7.

For example, referring briefly to FIG. 8, a close-up view is provided of the first electrical connection 272 with the first member 318 electrically disconnected from the second member 322. As is depicted, in at least one exemplary embodiment, the first member 318 of the first electrical connection 272 may have a prong 326 and define an opening 328. The second member 322 may similarly have a prong 330 and define an opening 332. The prong 326 of the first member 318 may extend into the opening 332 of the second member 322, and similarly, the prong 330 of the second member 322 may extend into the opening 328 of the first member 318. However, in other embodiments, any other suitable configuration may be provided for quickly and/or relatively easily electrically connecting and/or disconnecting the electric machine 246 to or from the electric communication bus 270.

It will be appreciated, however, that in other exemplary embodiments, the first electrical connection 272 may instead be configured in any other suitable manner. For example, in other embodiments, the first electrical connection 272 may be a more conventional electrical connection, may be a cooled electrical connection, may include anti-arcing structures/features, etc. Such may be important for relatively high voltage systems.

Figure 9:
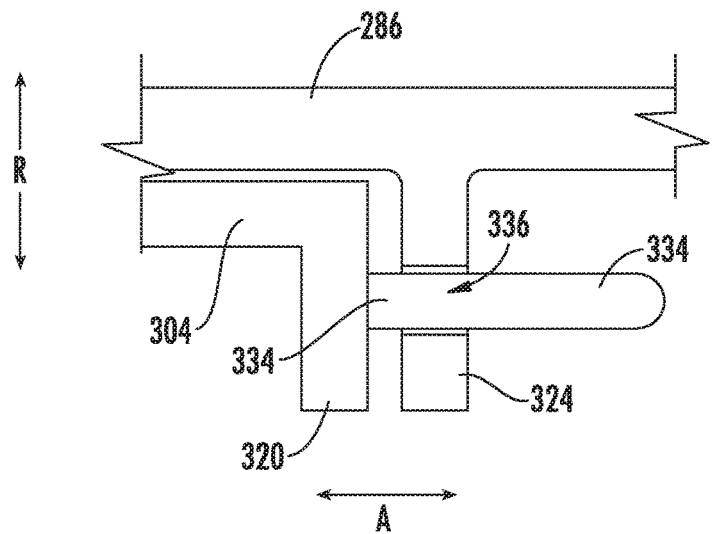
FIG. 9 is a schematic, close up view of a stator support and electric machine mount having alignment features in accordance with an exemplary embodiment of the present disclosure.

Further, referring again generally to FIGS. 4 through 6, it will be appreciated that in at least certain exemplary embodiments, the exemplary gas turbine engine may include one or more alignment features for ensuring the electric machine 246 is properly aligned and oriented within the turbomachine. For example, in certain exemplary embodiments, one or more of the stator support 286 and electric machine mount 304, shaft extension member 296 and LP shaft 224, etc. may include corresponding alignment features for ensuring the electric machine 246 is properly aligned and oriented within the turbomachine. Specifically, for example, referring now briefly to FIG. 9, providing a view of a stator support 286 and an electric machine mount 304 in accordance with one embodiment of the present disclosure, a flange 320 of the electric machine mount 304 and flange 324 of the stator support 286 may include one or more corresponding alignment features to ensure the electric machine 246 is properly aligned and oriented (e.g., along a circumferential direction) within the turbomachine. For the embodiment shown, the flange 320 includes an alignment pin 334 and the flange 324 includes an alignment opening 336. When the pin 334 is received within the opening 336 (e.g., during assembly/installation of the electric machine 246), the electric machine 246 may be properly aligned and oriented within the turbomachine. For the embodiment shown, the pin 334 is an elongated pin 334 (defining a length greater than a thickness of the flange 324 along the axial direction A, such as up to 1,000 times greater than the thickness of the flange 324), such that the pin 334 and opening 336 may guide the electric machine 246 along the axial direction A as it is installed, while ensuring proper circumferential positioning as well. Notably, however, in other embodiments, any other suitable alignment features may be provided (e.g., corresponding grooves or other features), and/or may be provided on any suitable components.

It should further be appreciated that the exemplary gas turbine engine, depicted in FIGS. 4 through 9, and more specifically, the exemplary turbomachine and electric machine 246 depicted in FIGS. 4 through 9, is provided by way of example only. In other exemplary embodiments, the gas turbine engine, and one or more components thereof, may be formed in any other suitable manner. For example, although the exemplary electric machine 246 depicted is an outrunner electric machine 246 (i.e., with the rotor magnets 284 positioned radially outward of the stator coils 288), in other exemplary embodiments, the configuration may be switched, such that the electric machine 246 is configured as an inrunner electric machine 246 (i.e., with the rotor magnets 284 positioned radially inward of the stator coils 288). Further, although the exemplary cover assembly 306 for the embodiment shown consists essentially of an aft cone 308 and a cavity wall 310, in other embodiments, any other suitable components may be included with the cover assembly 306, or alternatively, the cover assembly 306 may not include each of the components depicted. For example, in other embodiments, one or both of the aft cone 308 and the cavity wall 310 of the cover assembly 306 may additionally include layers of insulation, additional buffer layers, additional cover plating, etc. Further, in certain embodiments, the cover assembly 306 may be integrated with other systems of the electric machine 246 and/or gas turbine engine. For example, in other embodiment, the cover assembly 306 may be integrated with, e.g., a scavenge line of the electric machine lubrication system 264, an outlet duct of the buffer cavity 266, etc.

Figure 10:
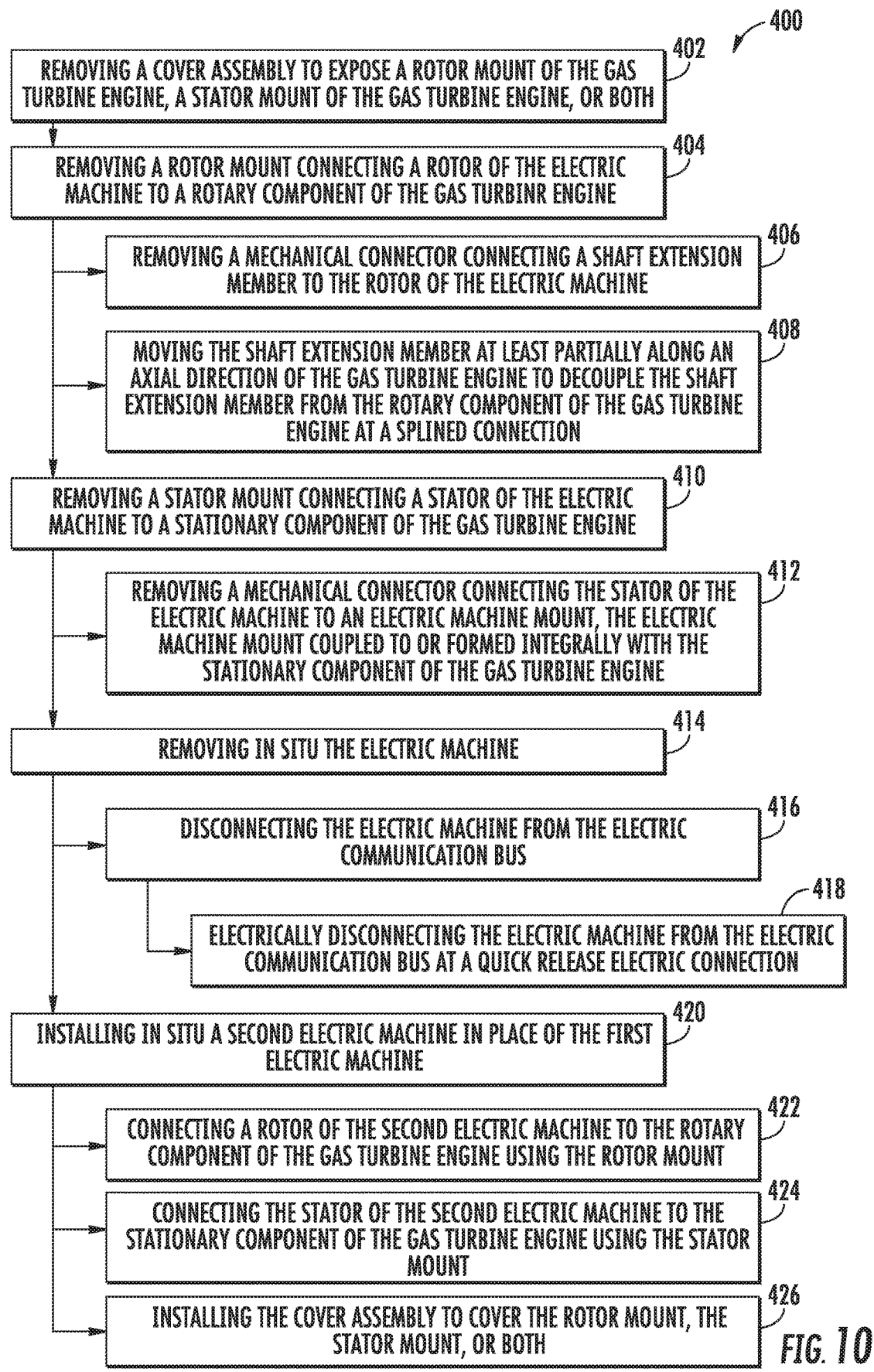
FIG. 10 is a flow diagram of a method for maintaining a gas turbine engine in accordance with an exemplary aspect of the present disclosure.

Referring now to FIG. 10, a flow diagram of a method 400 for maintaining a gas turbine engine installed on an aircraft in accordance with an exemplary aspect of the present disclosure is provided. The method 400 may generally be used with a gas turbine engine in accordance with one or more the exemplary embodiments described above. Accordingly, it will be appreciated that the gas turbine engine generally includes an electric machine mounted at least partially inward of a core air flowpath of the gas turbine engine.

The exemplary aspect of the method 400 depicted generally includes at (402) removing a cover assembly to expose a rotor mount of the gas turbine engine, a stator mount of the gas turbine engine, or both. More specifically, for the exemplary aspect depicted the cover assembly includes an aft cone and a cavity wall. Accordingly, removing the cover assembly at (402) may include removing both the aft cone and the cavity wall.

Additionally, the method 400 includes at (404) removing a rotor mount connecting a rotor of the electric machine to a rotary component of the gas turbine engine. For the exemplary aspect depicted, removing the rotor mount at (404) includes at (406) removing a mechanical connector connecting a shaft extension member to the rotor of the electric machine and at (408) moving the shaft extension member at least partially along an axial direction of the gas turbine engine to decouple the shaft extension member from the rotary component of the gas turbine engine at a splined connection. For example, in certain exemplary aspects, the moving the shaft extension member at least partially along the axial direction at (408) may include sliding the shaft extension member at least partially along the axial direction.

As noted, in certain exemplary aspects, the method 400 may be utilized with one or more of the exemplary gas turbine engines discussed above. Accordingly, in at least certain exemplary aspects, removing the mechanical connector connecting the shaft extension member to the rotor at (406) may include removing one or more bolts, screws, clamps, etc. Additionally, in other exemplary aspects, the shaft extension member may be removed in any other suitable manner. For example, in other embodiments, instead of sliding the shaft extension member at least partially along the axial direction to decouple the shaft extension member from the rotary component at (408), removing the rotor mount at (404) may include removing one or more mechanical connectors coupling the shaft extension member to the rotary component. Further, in still other exemplary aspects, the rotor of the electric machine may not be coupled to the rotary component through a shaft extension member, and instead may be coupled in any other suitable manner.

Referring still to the exemplary aspect depicted, the method 400 further includes at (410) removing a stator mount connecting a stator of the electric machine to a stationary component of the gas turbine engine. For the example aspect depicted, removing the stator mount at (410) includes at (412) removing a mechanical connector connecting the stator of the electric machine to an electric machine mount, the electric machine mount coupled to or formed integrally with the stationary component of the gas turbine engine. Similar to the exemplary aspect discussed above, removing the mechanical connector connecting the electric machine mount to the stator of the electric machine at (412) may include removing one or more bolts, screws, clamps, etc.

Further, the exemplary aspect depicted in FIG. 10 includes at (414) removing in situ the electric machine. It will be appreciated that the exemplary aspect described herein allows for the electric machine to be removed in situ, such that the gas turbine engine need not be removed from the aircraft with which it is installed, and does not need to be substantially disassembled. For example, in certain exemplary aspects, the electric machine may be removed at (414) with the only required disassembly being the removal of the cover assembly at (402), the removal of the rotor mount at (404) and the removal of the stator mount at (410).

Moreover, it will be appreciated that when installed, the electric machine is electrically coupled to the electric communication bus of the gas turbine engine and/or aircraft. Accordingly, as is depicted, removing in situ the electric machine at (414) further includes at (416) disconnecting the electric machine from the electric communication bus. More specifically, for the exemplary aspect depicted, disconnecting the electric machine from the electric communication bus at (416) includes at (418) electrically disconnecting the electric machine from the electric communication bus at a quick release electric connection. In such a manner, the electric machine may be essentially automatically electrically disconnected through the removal of the electric machine without use of any tools. However, in other exemplary aspects, as discussed above, the electric connection may not be a quick release electric connection.

Further, with the electric machine removed, which hereinafter may be referred to as a first electric machine, the exemplary aspect of the method 400 depicted in FIG. 10 includes at (420) installing in situ a second electric machine in place of the first electric machine. For the exemplary aspect depicted, installing in situ the second electric machine at (420) includes at (422) connecting a rotor of the second electric machine to the rotary component of the gas turbine engine using the rotor mount, at (424) connecting the stator of the second electric machine to the stationary component of the gas turbine engine using the stator mount, and at (426) installing the cover assembly to cover the rotor mount, the stator mount, or both.

It will be appreciated that for the exemplary aspect depicted, the gas turbine engine extends between a forward end and an aft end, and the electric machine is positioned at the aft end of the gas turbine engine. Further, it will be appreciated that the electric machine itself defines an aft end and the rotor mount, the stator mount, or both, are positioned proximate the aft end of the electric machine (i.e., position closer to the aft end than a forward end). However, in other exemplary aspects, any other suitable configuration may be provided. For example, in other exemplary embodiments, the electric machine may be positioned within a nose cone (e.g., within the rotatable front hub 236/spinner of the engine). With such an embodiment, the stator of the electric machine may be mounted to a stationary component of the engine through a suitable gearing, off a static carrier of a planetary gearbox (e.g., gearbox 234), or in any other suitable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for maintaining a gas turbine engine installed on an aircraft, the gas turbine engine including an electric machine mounted at least partially inward of a core air flowpath of the gas turbine engine, the method comprising:
   removing a rotor mount connecting a rotor of the electric machine to a rotary component of the gas turbine engine;
   removing a stator mount connecting a stator of the electric machine to a stationary component of the gas turbine engine; and
   removing in situ the electric machine, wherein the gas turbine engine extends between a forward end and an aft end, and wherein the electric machine is positioned at the aft end of the gas turbine engine, wherein removing in situ the electric machine comprises moving the electric machine to electrically disconnect the electric machine from the electric communication bus at a quick release electric connection, wherein the quick release electric connection includes a first member and a second member, wherein the first member and second member are automatically decoupled by removing in situ the electric machine.

2. The method of claim 1, further comprising:
   removing a cover assembly to expose the rotor mount, the stator mount, or both.

3. The method of claim 2, wherein the cover assembly includes an aft cone and a cavity wall.

4. The method of claim 1, wherein removing the rotor mount comprises removing a mechanical connector connecting a shaft extension member to the rotor of the electric machine.

5. The method of claim 4, wherein removing the rotor mount further comprises moving the shaft extension member at least partially along an axial direction of the gas turbine engine to decouple the shaft extension member from the rotary component of the gas turbine engine at a splined connection.

6. The method of claim 1, wherein the electric machine defines an aft end, and wherein the rotor mount, the stator mount, or both are positioned proximate the aft end of the electric machine.

7. The method of claim 1, wherein the electric machine is a first electric machine, and wherein the method further comprises:
   installing in situ a second electric machine in place of the first electric machine.

8. The method of claim 1, wherein the electric machine comprises at least one bearing configured to rotatably support the rotor of the electric machine relative to the stator of the electric machine, and wherein removing in situ the electric machine comprises removing in situ the electric machine as a complete unit.

9. A gas turbine engine defining a radial direction and an axial direction, the gas turbine engine comprising:
- a turbomachine comprising a compressor, a turbine, a rotary component rotatable with the compressor and the turbine, and a stationary component, the compressor and turbine together defining at least in part a core air flowpath;
- an electric machine positioned at least partially inward of the core air flowpath along the radial direction, the electric machine comprising a rotor and a stator;
- a rotor mount removably coupling the rotor of the electric machine to the rotary component;
- a stator mount removably coupling the stator of the electric machine to the stationary component; and
- a cover assembly removably positioned over the electric machine, the electric machine and cover assembly positioned such that the electric machine is removable from the gas turbine engine in situ when the cover assembly is removed;
- wherein the electric machine comprises a quick release electric connection for selectively electrically connecting the electric machine to an electric communication bus, wherein the quick release electrical connection includes a first member and a second member, and wherein the first and second members are automatically decoupled by removing in situ the electric machine.

10. The gas turbine engine of claim 9, wherein the cover assembly comprises an aft cone and a cavity wall.

11. The gas turbine engine of claim 9, wherein the cover assembly consists essentially of an aft cone and a cavity wall.

12. The gas turbine engine of claim 9, further comprising:
an electric communication bus; and
the electric machine electrically connected to the electric communication bus through the quick release electric connection.

13. The gas turbine engine of claim 9, wherein the gas turbine engine defines an aft end, and wherein the electric machine is positioned proximate the aft end.

14. The gas turbine engine of claim 9, wherein at least a portion of the cover assembly is visible from an outside of the gas turbine engine.

15. The gas turbine engine of claim 9, further comprising:
an electric machine mount coupled to, or formed integrally with, the stationary component of the turbomachine, and wherein the electric machine is slidably received on the electric machine mount.

16. The gas turbine engine of claim 9, wherein the stator mount fixedly couples the electric machine to an electric machine mount.

17. A method for maintaining a gas turbine engine installed on an aircraft, the gas turbine engine including an electric machine mounted at least partially inward of a core air flowpath of the gas turbine engine, the method comprising:
- removing a rotor mount connecting a rotor of the electric machine to a rotary component of the gas turbine engine;
- removing a stator mount connecting a stator of the electric machine to a stationary component of the gas turbine engine; and
- removing in situ the electric machine, wherein removing in situ the electric machine comprises moving the electric machine to electrically disconnect the electric machine from the electric communication bus at a quick release electric connection, wherein the quick release electric connection includes a first member and a second member, wherein the first member and second member are automatically decoupled by removing in situ the electric machine.

18. The method of claim 17, wherein moving the electric machine to electrically disconnect the electric machine from the electric communication bus comprises moving the electric machine at least partially along an axial direction of the engine to electrically disconnect the electric machine from the electric communication bus.

* * * * *